United States Patent [19]

Schweitzer et al.

[11] 4,022,247
[45] May 10, 1977

[54] BALANCED VALVE WITH PRESSURE SENSING MEANS

[75] Inventors: Raymond Louis Schweitzer, Allison Park; Eugene Robert Then; Eldert Bergen Pool, both of Pittsburgh, all of Pa.

[73] Assignee: Rockwell International Corporation, Pittsburgh, Pa.

[22] Filed: May 13, 1976

[21] Appl. No.: 686,186

[52] U.S. Cl. .................. 137/630.13; 137/630.15
[51] Int. Cl.² ........................................ F16K 1/32
[58] Field of Search ............... 137/630.13, 630.14, 137/630.15

[56] References Cited

UNITED STATES PATENTS

| 3,601,157 | 8/1971 | Milleville | 137/630.14 |
| 3,888,280 | 6/1975 | Tartaglia | 137/630.13 |

Primary Examiner—Robert G. Nilson

[57] ABSTRACT

An improved balanced valve includes a radial arrray of pressure sensing passages in the main disc which extend from the axial opening to a peripheral region of the disc below the seating surface of the disc such that when fluid flow reverses, as when there is a rupture of the first flow passage, an upward force is generated on the main disc just prior to closure which tends to resist the closing force on the valve, the pressure sensing passages allowing a higher fluid pressure to be communicated to the region above the main valve disc assembly to effectively oppose this resistance to closure.

9 Claims, 3 Drawing Figures

BALANCED VALVE WITH PRESSURE SENSING MEANS

BACKGROUND OF THE INVENTION

1. Field of the Invention

This invention related to a pressure balanced valve and, more specifically, to such a valve which includes an axial opening through a main valve disc assembly which facilitates effective balanced operation of the valve and has been improved to prevent forces resisting closure which forces are created by fluid flow by the valve disc as it approaches the seat from interfering with effective balanced closure.

2. Prior Art of the Invention

There have heretofore been provided large pressure balanced valves of the type disclosed in U.S. Pat. No. 3,601,157 which were primarily intended to isolate high pressure fluid flowing in a normal direction from above the valve seat. For proper operation of these valves, it was found that full, effective closure was made possible by providing a plurality of small passages through the main valve disc assembly which allowed communication between the upstream, high pressure fluid line and the top of the main valve disc assembly.

However, with increased safety and reliability requirements for some of the large power plants in which these valves might have been utilized, it became desirable to provide an alternative valve which could be closed more rapidly and was able to isolate fluid flow in either direction through the fluid line. Since the small passages were inappropriate for isolation of fluid from beneath the seat, a large bi-directional pressure balanced valve of the type disclosed in U.S. Pat. No. 3,888,280 for use in high pressure fluid lines was employed. This balanced configuration enabled fail-safe closure of the valve regardless of the direction of the flow therethrough by a plurality of springs if an opening force of a pneumatic motor assembly were no longer energized to maintain the valve in an opened position. If the valve were not effectively balanced, the force needed to close the valve under adverse conditions, such as during a sudden line break, would require a significantly larger spring configuration which would be physically impractical to provide. To insure against valve damage during closure, a dashpot assembly controlled the rate of closure by the springs to insure that it is maintained within an acceptable safe limit.

Although the valve of U.S. Pat. No. 3,888,280 has generally provided a satisfactory means for controlled prevention of fluid flow in either direction, it was found that excessive pulldown forces were generated when a large, 32-inch diameter valve was closed under a particularly demanding flow condition. It might, for example, be necessary to close the valve against fluid flow from below the seat at about 1,000 p.s.i. inlet pressure with the outlet at zero pressure, as might occur with a line rupture. An analysis based on tests of a smaller model and using accepted engineering and analytical methods indicated that the pulldown force generated on such a large valve under these extreme conditions could overload the dashpot and might result in its failure. Although a larger and/or heavier dashpot assembly might have been designed to satisfy this condition, there were other considerations which made this an unattractive alternative. The space provided the dashpot assembly within the operating mechanism for the valve was limited and physically relocating the springs or any other components of the mechanism would require extensive, complicated redesign. Because power plant safety requirements include seismic considerations and the ability of the valve and the pipes to withstand shock, it was also undesirable to increase the mass of the dashpot assembly, and thus the operating mechanism which extends in a cantilevered fashion from the pipes. Therefore, determining the cause of the excessive pulldown forces and providing for their reduction was most desirable.

The rapid fluid flow from beneath the seat produced a velocity pressure which was added to the static pressure of the fluid to produce a higher, stagnation pressure in an axial opening in the main valve disc assembly. The effect of the velocity pressure on the axial opening was then transmitted into the upper chamber of the valve body through the axial opening of the main valve assembly and unintentionally augmented the static pressure needed to provide the desired balanced operation. It was clear that the resulting stagnation pressure acting on top of the main valve disc assembly which created these excessive pulldown forces was not sufficiently opposed by a lesser total pressure from beneath the main disc which acted directly thereon. The lesser total pressure could at least be partially caused by the inclination of the inlet pipe, and thus the direction of fluid flow, with respect to the main disc. Since the stagnation pressure is sufficient to overcome the pressure from beneath the main disc, the main valve disc assembly is positioned downwardly with respect to the stem during closure, preventing the axial opening from being closed by an auxiliary valve disc even though it is capable of closing the axial opening at other times during valve operation.

To prevent the velocity pressure of fluid flow from beneath the seat from producing an excessively overbalanced condition, the valve was improved to include a flow deflecting device to prevent impingement of the fluid flow on an axial opening through the main valve disc assembly which opening facilitated communication of opposite sides of the valve disc assembly. The flow deflecting device preferably included a deflector plate in fixed, spaced relationship from the lower surface of the main disc as is generally disclosed in U.S. patent application Ser. No. 631,286, entitled "Bi-Directional Pressure Balanced Valve," filed on Nov. 12, 1975, by E. B. Pool and L. J. Pavagadhi and assigned to the assignee of the present invention.

However, notwithstanding the improved operation of the valve as disclosed in the above mentioned application, there has been found to exist additional undesired forces acting on the main disc during closure when fluid flow originates from above the main disc. The balanced valve, as mentioned above, is designed for rapid closure in either direction of fluid flow which might result from a break in the line. Similar tests and analyses as those described above have shown that as the valve closes during a condition of loss of pressure in the line below the valve seat, an undesirable upward force on the main disc is generated by the fluid flow. As presently understood, just prior to closure, when the distance of the valve lift from the seat is about 5% to 30% of the minimum port diameter for the valve assembly, a significant resistance to closure is produced by this upward force as the fluid seeks the path of least resistance from the flow passage above the seat, past the disc and seat and into the passage below the seat.

Any resistance to closure must be considered when designing an operating mechanism for the valve. As mentioned hereinabove, such a mechanism might include a spring configuration to provide the force needed for rapid closure. The spring would have to be significantly larger if this resistance to closure could not be reduced or eliminated and a larger spring would tend to complicate space, weight and seismic considerations during design. This would be equally true if other forms of operating mechanisms were employed for rapid closure of the valve. For example, the operating mechanisms disclosed in United States patent application Ser. No. 663,787, entitled "Valve Actuator," filed on Mar. 4, 1976, by D. W. Duffey, and assigned to the assignee of the present invention, could be utilized with the valve of the present invention. However, as also explained in this application, the size and weight of the mechanism is of real concern so that reduction or elimination of undesired resistance to closure would be highly advantageous when trying to provide an acceptable valve-operating mechanism configuration.

SUMMARY OF THE INVENTION

It is an object of the present invention to include a pressure balanced valve which will remain effectively balanced throughout closure when fluid flow originates from above the seat and would tend to produce a significant upward force on the main disc just prior to its engagement with the seat.

It is also an object to provide a valve of the type described which can be utilized in either one-directional or bi-directional fluid flow passage configurations.

It is another object to provide a valve of the type described which includes an array of outwardly extending pressure sensing passages in the main disc which terminates at a pheripheral region of the main disc just below the seating surface thereon and thereby communicates an increased pressure to the upper side of the main valve disc assembly to oppose a resistance to closure caused by the upward force on the main disc.

It is still another object to provide a valve of the type described which can be inexpensively manufactured while readily accommodating the inclusion therein of a deflecting device if one is needed for balanced closure against fluid flow from beneath the seat.

These and other objects of the invention are achieved in a preferred embodiment thereof in the form of an improved pressure balanced valve of the type which includes a body having a cylindrical valve chamber and a pair of flow passages intersecting a lower portion of the valve chamber. An annular valve seat is between the lower portion and a first one of the flow passages and coaxially aligned with the cylindrical valve body. A main valve disc assembly is mounted for axial movement within the cylindrical valve chamber for selective engagement of a main disc thereof with the seat and further includes a concentric hollow body extending from the main disc away from the seat to terminate at a piston fitting which is slidably received within an upper portion of the cylindrical valve stem extends from an operating mechanism located above the valve through the upper portion, the piston fitting and the hollow body to terminate at an auxiliary valve disc. There is included a means for communicating a region above the disc assembly with a region below the main disc to substantially control fluid forces acting on the opposite sides of the main valve disc assembly to facilitate opening and closing of the valve regardless of the direction of fluid flow through the valve. The means for communicating includes predetermined axial positioning of the auxiliary valve disc during the operation of the valve stem to open and close an axial opening through the main valve disc assembly. The improvement includes at least one pressure sensing passage in the main disc which extends from a peripheral region of the main disc to a location within the axial opening below the auxiliary valve disc. The peripheral region of the main disc is located within the first passage and adjacent the seat when the main disc engages the seat. The pressure sensing passage is generally aligned with the pair of flow passages to sense the fluid flow in either direction along a most direct path therebetween when the main valve disc assembly is approaching the seat.

DESCRIPTION OF THE PREFERRED EMBODIMENT

Figure 1:
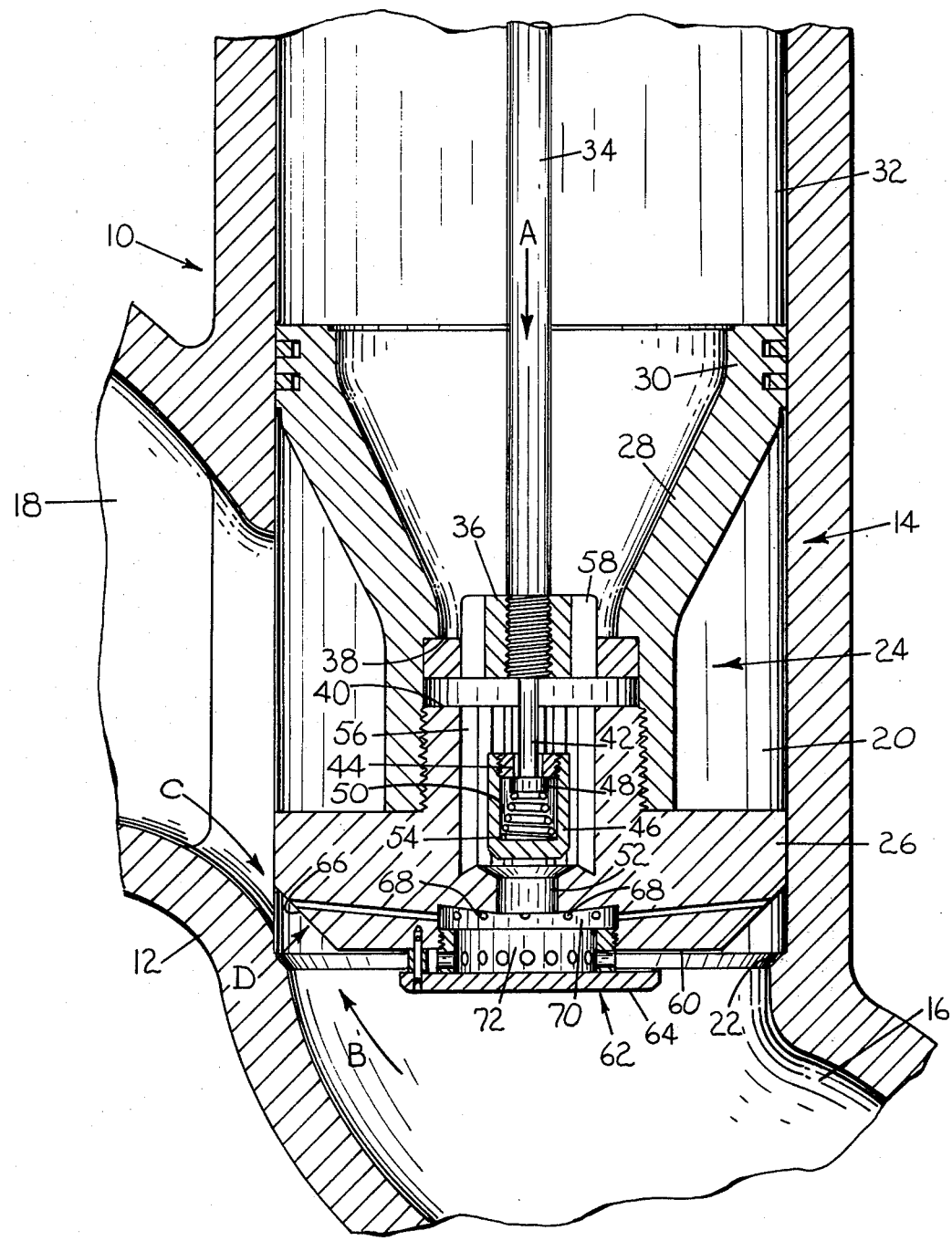
FIG. 1 is a fragmentary side elevation, partially in section, of the preferred valve including various features of the invention.

As seen in FIG. 1, a preferred pressure balanced valve 10 of the present invention includes a body 12 having a cylindrical valve chamber 14 and a pair of flow passages 16 and 18 intersecting a lower portion 20 of the cylindrical valve chamber 14. An annular valve seat 22 is between the lower portion 20 and the flow passage 16 and is coaxially aligned with the cylindrical valve chamber 14. The valve 10 represents the preferred embodiment of the invention and is similar to the embodiments disclosed in U.S. Pat. No. 3,888,280 and U.S. patent application Ser. No. 631,286 mentioned hereinabove and incorporated herein by reference but has been improved to include additional features according to the present invention. It will be apparent to those skilled in the valve art that the present invention will be applicable for utilization on the specific embodiments shown therein and any other pressure balanced valves having a different configuration, but nevertheless operating in a similar manner. Additionally, it will be seen that the present invention will be equally applicable for valves which are primarily intended to operate in a one-directional fluid flow passage configuration although, for the sake of the present disclosure, the preferred embodiment is a bi-directional pressure balanced valve.

A main valve disc assembly 24 of the valve 10 is mounted within the cylindrical valve chamber 14 for axial movement for selective engagement of a main disc 26 thereof with the seat 22. The main valve disc assembly 24 also includes a concentric hollow body 28 which extends from the main disc 26 away from the seat 22. A piston fitting 30 of the assembly 24 is provided at the extended end of the hollow body 28 for sliding, relatively sealed movement within an upper portion 32 of the cylindrical valve chamber 14. The hollow body 28 might have an intermediate portion with a smaller outside diameter than the main disc 26, as shown in the preferred embodiment, or might alternatively extend more directly from the edge of the main disc 28 to the piston fitting 30.

A valve stem 34 extends from an operating mechanism (not shown) located above the cylindrical valve chamber 14 into and through upper portion 32, the piston fitting 30 and the hollow body 28. The preferred operating mechanism, as disclosed in U.S. Pat. No. 3,888,280, includes a pneumatic motor assembly, a dashpot assembly and a plurality of springs which are capable of applying a spring force to the stem 34 for closure of the valve 10, in a direction as indicated by the arrow A. A collar 36 is mounted at a longitudinally fixed position on stem 34 between opposed engaging surfaces 38 and 40 of the hollow body 28 and the disc 26, respectively. The stem 34 continues through the collar 36 to terminate at an extended end 42 thereof. The extended end 42 of the stem 34 extends through an opening 44 of auxiliary valve disc 46. An enlarged portion 48 of the extended end 42 is received within a cavity 50 of the auxiliary valve disc 46 for retention of the auxiliary valve disc 46 on the extended end 42 of the stem 34 throughout valve operation.

As seen in FIG. 1, the main valve disc assembly 24 is being closed by the spring force and is shown at the general location mentioned hereinabove at which the undesired resistance to closure has been experienced. The downward movement of the stem 34 and the collar 36 allows movement of the main valve disc assembly 24 toward the seat 22. During downward movement against fluid flow from either passage 16 or 18 (as respectively indicated by arrows B and C), the fluid pressure beneath the disc 26 in the lower portion 20 is intended to pass through the main valve disc assembly 24 by way of an axial opening 52 therethrough to maintain the upper portion 32 generally at the same fluid pressure as that below for effective balanced closure. A spring 54 allows upward movement of the auxiliary valve disc 46, in a check valve fashion, so that fluid communicates around the auxiliary valve disc at 56 and continues through openings 58 in the collar 36 and into the upper portion 32.

As was discussed in the above mentioned application, fluid flow from beneath the seat 22 during closure was found to impinge on the axial opening 52. The velocity pressure of flow in this direction had added to the fluid static pressure to produce a stagnation pressure in the axial opening 52 which was apparently transmitted around the auxiliary valve disc 46 and into the upper portion 32 of the cylindrical valve chamber 14. The resulting stagnation pressure in the upper portion 32 of the cylindrical valve chamber 14 created the excessive pulldown force mentioned hereinabove as the piston fitting 30 generally prevented leakage around the main valve disc assembly 24. To reduce the effect of the velocity pressure on the axial opening 52, a deflecting device 62 was provided. The deflecting device 62 preferably includes a deflector plate 64 which is secured at the lower surface 60 of the main disc 26 in general alignment with the axial opening 52. Although the deflecting device 62 of the present invention has been provided in a different form and with a different mounting means to locate it in alignment with the axial opening 52 to effectively deflect the path of the fluid flow from the flow passage 16 from direct impingement on the axial opening 52, the deflecting plate 64 is now preferred for reasons which will be discussed hereinbelow.

However, it is the effect on the balanced operation which occurs during closure of the main valve disc assembly 24 against fluid flow from flow passage 18 to flow passage 16 (as indicated by the arrow C) which is of primary concern in this invention. Although, as explained hereinabove, the axial opening 52 affords communication above and below the main valve disc assembly 24 in an effort to equalize the fluid pressure in the upper chamber 32 and the pressure below the main disc 26, for the main valve disc assembly 24 to be balanced the pressures would need to be uniform over the entire upper and lower surfaces. The pressure below the main disc 26 is not uniform throughout closure when the fluid is flowing from above the seat 22 into the passage 16.

Specifically, with flow from passage 18 to passage 16 just prior to closure, as shown in FIG. 1, the fluid seeks a path of least resistance along arrow C. While the major portion of the lower surface of the main disc 16 is being subjected to a relatively lower pressure due to the evacuation of fluid from fluid passage 16 (as with a line rupture), a peripheral region 66 of the main disc 26 is being subjected to fluid pressure greater than that in passage 16 but less than that in passage 18. The peripheral region 66 is generally aligned with the flow passages 18 and 16 in the region of maximum flow therebetween as the fluid flows by the seat 22 just prior to closure. The elevated pressure at the peripheral region 66 creates an additional force on the main valve disc assembly 24 from beneath the main disc 26 in a direction generally indicated by the arrow D. The force D includes a resulting upward vector force which resists closure. This condition would exist for the valve 10 when it is being utilized in either a one-directional or bi-directional fluid flow passage configuration.

Since the force on the peripheral region 66 cannot be uniformly spread about the lower surface of the main disc 16 and is, therefore, not sensed at the axial opening 52 by communication by the deflecting plate 64, a means has been provided for sensing fluid pressure at the peripheral region 66 and for transmitting it to the axial opening 52. This means includes at least one pressure sensing passage 68 through the main disc 26 which extends from the peripheral region 66 to the axial opening 52, which pressure sensing passage 68 is aligned with the flow passages 16 and 18 and the fluid flow therebetween past seat 22.

Figure 2:
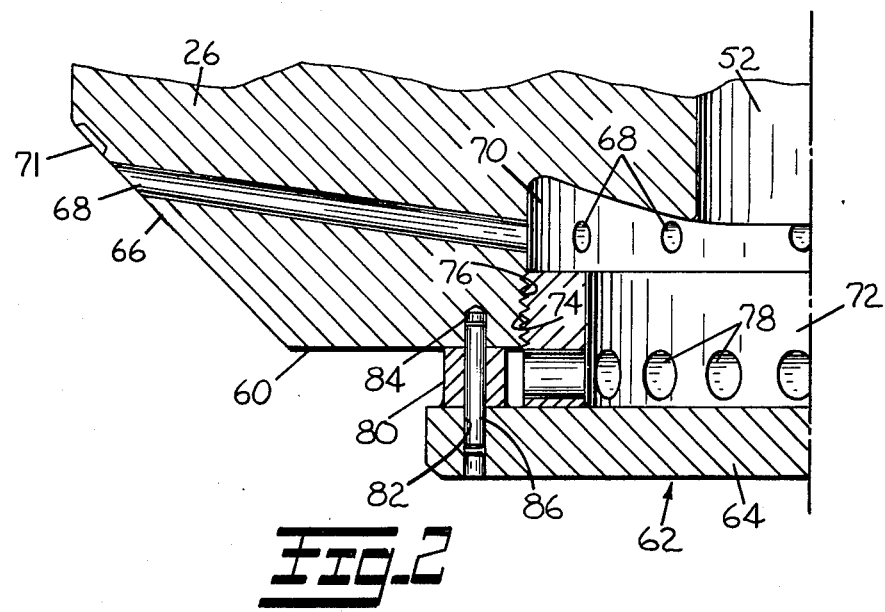
FIG. 2 is an enlarged, fragmentary view, partially in section, of the preferred main disc of the valve of FIG. 1.

As best seen in FIG. 2, the preferred valve 10 includes a plurality of pressure sensing passages 68, 12 in the embodiment shown, which are in an evenly spaced radially extending array about the axial opening 52. The array of pressure sensing passages 68 is provided in the preferred embodiment to facilitate free rotation of the main valve disc assembly 24 throughout valve operation while ensuring that at least one pressure sensing passage 68 is properly aligned with the fluid flow in the direction indicated by the arrow C to sense the higher fluid pressure at the peripheral region 66 which primarily produces the upward force D. With a relatively large number of passages 68 being provided for the main disc 26, it can be expected that several passages 68 will be sufficiently aligned with this region of higher fluid pressure to have a combined influence on the production of the desired, resulting pressure in the axial opening 52. While the preferred pressure sensing passages 68 extend radially from the axial opening 52, it should be understood that this configuration was primarily chosen for manufacturing reasons and that any reasonable path which extends outwardly from the axial opening 52 to terminate at the peripheral region 66 might be employed.

Because of the difficulties encountered in boring such a long, small diameter hole during manufacture, the axial opening 52 has been enlarged to decrease the length of the pressure sensing passages 68 as they extend from the peripheral region 66 just below the seating surface 71 of the main disc 26. An enlarged portion 70 of the axial opening 52 is located below the auxiliary valve disc 46 to provide the axial opening 52 in this region with a significantly larger diameter than it has at the auxiliary valve disc 46. The enlarged portion 70 provides a location for termination of each pressure sensing passage 68 which decreases their required length.

Providing an enlarged portion 70 for the axial opening 52 facilitates an alternative means for mounting the deflecting device 62. While the deflecting device 62 still includes a deflector plate 64 previously employed, there is now included an upwardly extending collar portion 72 thereof having external threads 74 for receipt within matching internal threads 76 of the enlarged portion 70. The preferred extended collar 72 is fixedly joined to the deflector plate 64, as by welding, and includes a plurality of holes 78 therethrough to facilitate communication of fluid from the lower surface 60 of the main disc 26 to the interior of the axial opening 52. The plurality of holes 78, sixteen in the preferred embodiment, are evenly distributed about the circumference of the extended collar 72 to allow entrance of fluid into the axial opening independent of the orientation of the main disc 26 during valve operation.

While the threads 74 and 76 ensure the deflector plate 64 will be securely mounted to the main disc 26, they do not provide for proper location of the deflector plate 64 relative to the lower surface 60 of the main disc 26. Accordingly, at least one spacing tube 80, and three such tubes, evenly spaced in the preferred embodiment, are secured, as by welding, to the upper surface of the deflector plate 64. The height of the spacing tubes 80 is such that insertion of the extended collar 72 within the enlarged portion 70 is limited by their making contact with the lower surface 60. Each spacing tube 80 and an aligned portion of the deflector plate on which it is mounted includes a hole 82 therethrough. To prevent rotation of the deflector plate 64 after it is mounted on the main disc 26, a drill is inserted in a hole 52 of one of the spacing tubes 80 to provide an aligned hole 84 in the main disc 26. A pin 86 is then inserted through the hole 82 and into the hole 84 and spotwelded in place to prevent rotation of the deflecting device 62 which might occur during valve operation.

Figure 3:
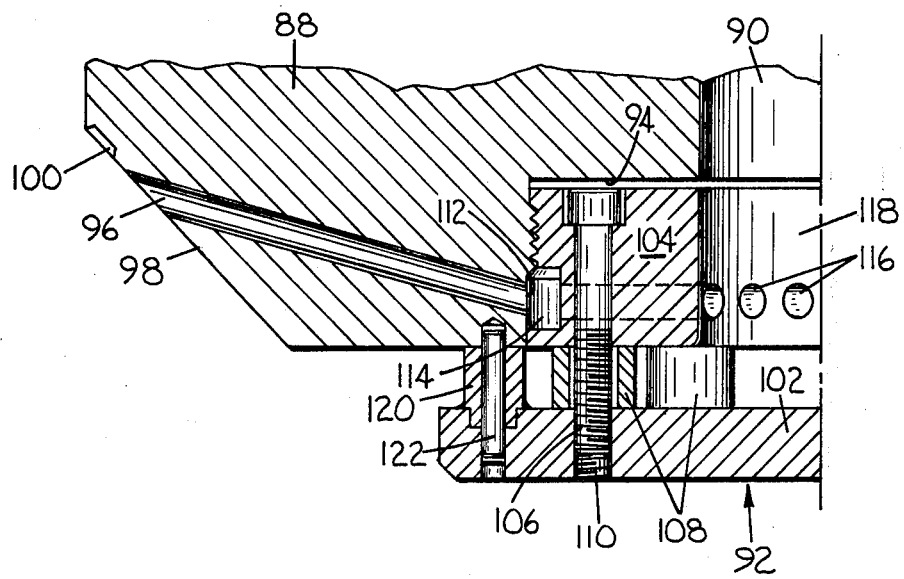
FIG. 3 is a view like that of FIG. 2 of an alternative embodiment of the invention.

As seen in FIG. 3, an alternative embodiment of the present invention includes a main disc 88, an axial opening 90 and an alternative deflecting device 92. While the embodiment of FIG. 3 again includes an enlarged portion 94 to decrease the required length of the plurality of pressure sensing passages 96 which extend inwardly from the peripheral region 98 below the seating surface 100 of the main disc 88, the deflecting device 92 includes a different configuration. In the deflecting device 92 there is again included a deflector plate 102 similar to the deflector plate 62 described hereinabove, but an extended collar 104 is mounted in a different manner to the deflector plate 102 and provides a different means for facilitating communication of the fluid from below the main disc 88 to the axial opening 90.

The extended collar 104 is secured to the deflector plate 102 by a plurality of bolts 106 each of which extends therethrough, through a spacing element 108 and into a threaded hole 110 through the deflector plate 102. The bolts 106 and the spacing elements 108, six in the preferred embodiment, are evenly spaced to provide access therebetween for fluid flow independent of the orientation of the main disc 88 during the valve operation. While the extended collar 104 is again threadedly received within the enlarged portion 94 of the axial opening 90, its extension therein is sufficient to overlap a location 112 of the enlarged portion 94 at which the pressure sensing passages 96 terminate. To allow the pressure at the location 112 to be sensed within the axial opening 90, a circumferential groove 114 in the outer surface of the collar 104 is aligned with the location 112 and a plurality of holes 116 extends inwardly therefrom to an interior opening 118 of the collar 104. The groove 114 is sufficiently large to facilitate free fluid communication from the pressure sensing passages 96 to any generally aligned hole 116 when the extended collar 104 is fully received within the enlarged portion 94. To again ensure proper location of the deflector plate 102 and to prevent its rotation with respect to the main disc 88, a spacing tube 120 and pin 122 are again employed.

While the embodiments described hereinabove provide a means in the form of the pressure sensing passages for transmitting a higher fluid pressure to the upper portion 32 of the cylindrical valve chamber 14 to overcome the resistance to closure generated by fluid flow by the seat 22 from passage 18 just prior to closure, an additional advantage during closure against flow from passage 16, in the direction indicated by the arrow B in FIG. 1, can also be realized. As explained above, because of pressure drops in the fluid as it flows in the direction indicated by arrow C, a higher pressure is snesed in the pressure sensing passage 68. Similarly, with flow from the other direction when passage 18 is at a lower pressure, as might occur during a line rupture, there are pressure drops across the peripheral region 66 as the fluid flows from the region of higher pressure in passage 16. While the purpose of the deflecting device 62 was to decrease the pulldown force on the main valve disc assembly 24 during closure against fluid flow in this directon, some fluid velocity pressures might still remain so that the pressure in the upper portion 32 above the main valve disc assembly 24 could produce a downward force somewhat larger than the upward force thereon during closure. Since fluid pressure in the peripheral region 66 is lower during fluid flow in the direction indicated by the arrow B, the pressure sensing passage 68 tends to decrease the pressure in the axial opening 52, and thus the pressure in the upper portion 32, to further reduce and remaining undesired pulldown force on the main valve disc assembly 24. Accordingly, while the pressure sensing passage 68 increases the pressure above the main valve disc assembly 24 when flow is from passage 18 to overcome a resistance to closure, the pressure sensing passage 68 decreases the pressure above the main valve disc assembly 24 during closure against flow from passage 16 to decrease the pulldown force which flow in this direction might tend to produce.

It should also now be apparent that the present invention might be employed in a bi-directional valve which does not include a deflecting device. First, as discussed in the above mentioned application disclosing the deflecting device, it is recognized that in some valve flow passage configurations the velocity forces might not produce a significant unbalanced pulldown force during closure against flow from beneath the seat. Clearly, the present invention would be applicable for effective, balanced operation of this type valve without a deflecting device. Second, as demonstrated in the paragraph above, the present invention can influence the magnitude of the effect of velocity forces which might exist. It might be possible by altering the axial opening or providing only partial deflection of a different form to employ the present invention to control the effect of the velocity forces so that balanced operation could be provided during closure against flow in either direction. Accordingly, the present disclosure should enable one skilled in the art to design the pressure sensing passages to satisfy the particular valve configuration to be employed when one considers the type and magnitude of the undesired forces acting thereon. The size, orientation and number of passages could be obviously altered. Additionally, taking into consideration the full range of fluid pressure drops that exist as fluid flows by the main disc and the seat, the exact location of the peripheral region and thus the termination of the pressure sensing passages, with respect to the seating surface of the main disc might be altered. This would make it possible to select a predetermined magnitude for the compensating effect produced during closure with flow in one direction as compared with flow in the other direction.

As should be clear from the disclosure hereinabove, the present invention can be employed for balanced valves in either one-directional or a bi-directional fluid flow passage configuration. It should also be apparent to those skilled in the valve art that the present invention, although having obvious application for the larger valves on which greater unbalanced forces can be generated, can be effectively utilized to improve the design of smaller valves by decreasing the size and/or weight requirements of the operating mechanism. It should also be clear that a different embodiment from the preferred embodiments shown hereinabove might be provided without departing from the spirit and scope of the invention as claimed.

What is claimed is:

1. An improved pressure balanced valve of the type which includes a body having a cylindrical valve chamber and a pair of flow passages intersecting a lower portion of said cylindrical valve chamber; an annular valve seat between said lower portion and a first of said flow passages and coaxially aligned with said cylindrical valve chamber; a main valve disc assembly mounted for axial movement within said cylindrical valve chamber for selective engagement of a main disc thereof with said seat and further including a concentric body member extending from said main disc away from said seat to terminate at a piston fitting which is slidably received within an upper portion of said cylindrical valve chamber; a coaxially aligned valve stem extending from an operating mechanism located above said valve through said upper portion, said piston fitting and said hollow body to terminate at an auxiliary valve disc; means for communicating a region above said main valve disc assembly with a region below said main disc to substantially control fluid forces acting on the opposite sides of said main valve disc assembly to facilitate opening and closing of said valve regardless of the direction of fluid flow through said valve, which means for communicating includes predetermined axial positioning of said auxiliary valve disc during operation of said valve stem to open and close an axial opening through said main valve disc assembly: wherein said improvement comprises:

at least one pressure sensing passage in said main disc, which said pressure sensing passage extends from a peripheral region of said main disc to a location within said axial opening below said auxiliary valve disc;

said region of said main disc being located within said first passage and adjacent said seat when said main disc engages said seat; and said pressure sensing passage being substantially aligned with said pair of flow passages to generally sense said fluid flow in a direction along a most direct path therebetween when said main valve disc assembly is approaching said seat.

2. The improved valve as set forth in claim 1, further including means for preventing fluid flow from said first of said flow passages from impinging on said axial opening of said main valve disc assembly during said closing of said valve to reduce the effect of velocity pressure on said axial opening.

3. The improved valve as set forth in claim 1, wherein said one said pressure sensing passage is among an array of said pressure sensing passages extending outwardly from said axial opening.

4. The improved valve as set forth in claim 3, wherein said pressure sensing passages of said array are evenly spaced one from the other and extend radially from said axial opening.

5. The improved valve as set forth in claim 3, wherein said axial opening includes an enlarged portion and said location within said axial opening is within said enlarged portion.

6. The improved valve as set forth in claim 5, wherein said means for preventing said fluid flow from said first of said flow passages from said impinging includes a flow deflecting device in the form of a circular deflector plate having an extended collar portion thereon which is threadably received within said enlarged portion of said axial opening for central alignment therewith.

7. The improved valve as set forth in claim 6, further including means for locating said deflector plate relative to said main disc and for preventing its rotation during valve operation.

8. The improved valve as set forth in claim 6, wherein said collar portion includes a plurality of radially extending holes therethrough to facilitate fluid communication from below said main disc to said axial opening.

9. The improved valve as set forth in claim 6, wherein said collar portion overlies said location as said collar portion is received within said enlarged portion of said axial opening and said collar portion includes a circumferential groove aligned with said location and a plurality of radially extending ports therethrough which extend from said groove to an exterior region of said axial opening.

* * * * *

UNITED STATES PATENT AND TRADEMARK OFFICE
CERTIFICATE OF CORRECTION

PATENT NO. : 4,022,247

DATED : May 10, 1977

INVENTOR(S) : Raymond Louis Schweitzer, Eugene Robert Then, and Eldert Bergen Pool It is certified that error appears in the above-identified patent and that said Letters Patent are hereby corrected as shown below:

Column 3, Line 62, after "valve" insert --chamber. A coaxially aligned valve--.

Column 8, Line 38, after "is" delete 'snesed' and insert --sensed--.

Signed and Sealed this

Twentieth Day of September 1977

[SEAL]

Attest:

RUTH C. MASON
Attesting Officer

LUTRELLE F. PARKER
Acting Commissioner of Patents and Trademarks